United States Patent [19]

Lockard

[11] Patent Number: 4,938,639
[45] Date of Patent: Jul. 3, 1990

[54] COMBINATION TOOL HOLDER
[75] Inventor: Thomas A. Lockard, Raleigh, N.C.
[73] Assignee: Kennametal Inc., Latrobe, Pa.
[21] Appl. No.: 351,692
[22] Filed: May 12, 1989
[51] Int. Cl.⁵ .................. B23B 27/16; B23B 27/02
[52] U.S. Cl. .................................. 407/103; 407/104
[58] Field of Search ............... 407/103, 104, 105, 106
[56] References Cited
U.S. PATENT DOCUMENTS
3,648,341  3/1972  Viellet ........................... 402/104

Primary Examiner—William Terrell
Attorney, Agent, or Firm—Thomas R. Trempus

[57] ABSTRACT

The present invention entails a combination tool holder designed to accept various different cutting inserts, shims and shim securing devices. In particular, the tool holder is provided with a shim and shim securing assembly that maximizes shim bearing surface and therefore is suitable for supporting cutting inserts that tend to be brittle and relatively low in transverse rupture strength.

6 Claims, 3 Drawing Sheets

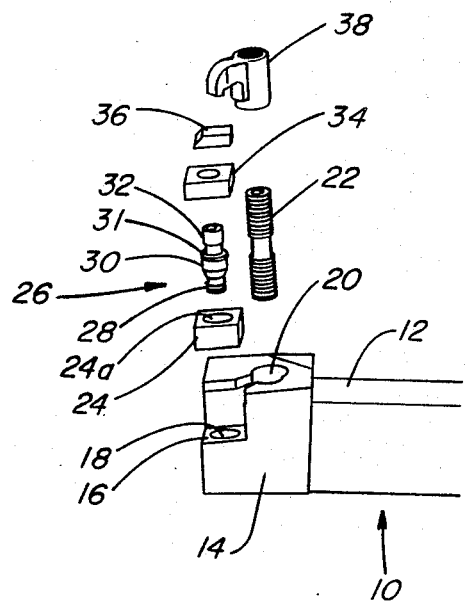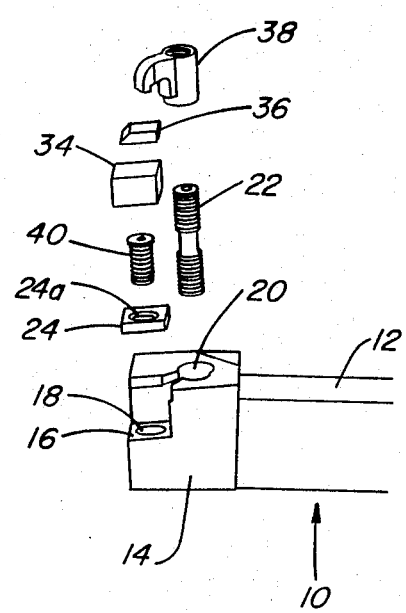
Fig. 2
Fig. 3

COMBINATION TOOL HOLDER

FIELD OF THE INVENTION

The present invention relates to tool holders, and more particularly to combination tool holders that are designed to accept multiple types of cutting inserts, shims, and shim securing devices.

BACKGROUND OF THE INVENTION

Traditionally, tool holders have been designed to accept carbide cutting inserts. Typically, a seat area is formed about the head of the tool holder and a shim is secured about the seat area by a shim screw that threads into an underlying threaded bore. A cutting insert is secured atop the shim by a clamping mechanism.

In order to provide for versatility, tool holders have been designed to accommodate various types of cutting inserts. For example, Kennametal, Inc. of Latrobe, Pa., offers a combination tool holder, known as the "Kenloc" combination tool holder, that is designed to accept different types of cutting inserts having different thicknesses, etc. To accommodate these different inserts it has been necessary to provide different shim thicknesses and different methods of securing the shims to the head of the tool holder. In the Kennametal "Kenloc" tool holder for example, there is provided the option of securing a shim by a threaded lock pin with a concentric flange that enters the shim counterbore, or simply securing a shim by means of a shim retaining screw that enters the shim counterbore and is threaded into the tool holder.

As noted above, the shims are designed to be directly secured to an underlying seat area formed in the tool holder. In order to provide for direct securement to the tool holder these shims are provided with a counterbore opening that is designed to receive a shim securing device such as a shim retaining screw or a concentric type locking pin. It is therefore appreciated that the presence of the shim opening effectively decreases the bearing surface of the shim which in turn provides support for the cutting insert. This decrease in effective shim bearing surface can be significant especially where the shim is designed to be used in a combination tool holder. This is because the area of the shim opening must be large enough to be compatible with the shim securing means and particularly the threaded bore underlying the seating area.

Generally, the bearing surface of the shim has not been critical when the shim is used to support a conventional carbide cutting insert. But in recent years advanced materials such as ceramic, cermet, CBN, and sailon have become popular especially in high-speed machining operations. These inserts, while high in compressive strength, tend to be brittle and relatively low in transverse rupture strength. Thus, the larger the shim opening the less the bearing surface and consequently the potential for rupture or breakage of the cutting insert is increased.

Therefore, there is a need to provide a combination tool holder that is capable of accepting and accommodating various different types of cutting inserts including the so-called advanced material cutting inserts but which is provided with the capability of maximizing shim bearing surface for these hard but brittle inserts.

SUMMARY AND OBJECTS OF THE INVENTION

The present invention entails a combination tool holder that is provided with a shim screw adapter that permits the tool holder to accept a shim with a shim opening of minimum area. Consequently, the bearing surface of the shim is relatively large compared to the bearing surfaces of other shims that may be received by the same tool holder.

In particular, the combination tool holder of the present invention is provided with a seating area that includes a main threaded bore and eccentric tapered bore therein. Forming a part of the present invention is an adapter or bushing that is threaded into the main bore and which itself includes a second inner threaded bore for receiving a shim screw. The shim screw adapted to screw into the adapter or bushing is designed to be compatible with a shim having a relatively small shim opening. Consequently, it is appreciated that this gives rise to a relatively large shim bearing surface.

It is therefore an object of the present invention to provide a combination tool holder that is capable of receiving a variety of different cutting inserts including those formed from relatively hard but brittle advanced cutting materials.

It is also an object of the present invention to provide a combination tool holder having a seating area and a major threaded bore underlying the seating area with a shim screw adapter designed to be received in the major threaded bore and itself adapted to receive a shim screw that is specifically provided to fit a shim having a relatively small shim screw opening.

It is also an object of the present invention to provide a combination tool holder that is capable of accommodating shims having both relatively large and small shim screw openings.

A more specific object of the present invention is to provide a shim screw adapter for the major threaded bore that itself includes a shim screw threaded bore formed therein for enabling a shim having a relatively small shim opening to be secured about the seating area of the tool holder.

Other objects and advantages of the present invention will become apparent and obvious from a study of the following description and the accompanying drawings which are merely illustrative of such invention.

BRIEF DESCRIPTION OF THE DRAWINGS

FIG. 2 is a fragmentary exploded view of a combination tool holder having a lock pin type shim securing device.

FIG. 3 is a fragmentary exploded view of a combination tool holder having a standard shim retaining screw for securing a shim about the seating area of the tool holder.

DETAILED DESCRIPTION OF THE INVENTION

Figure 1:
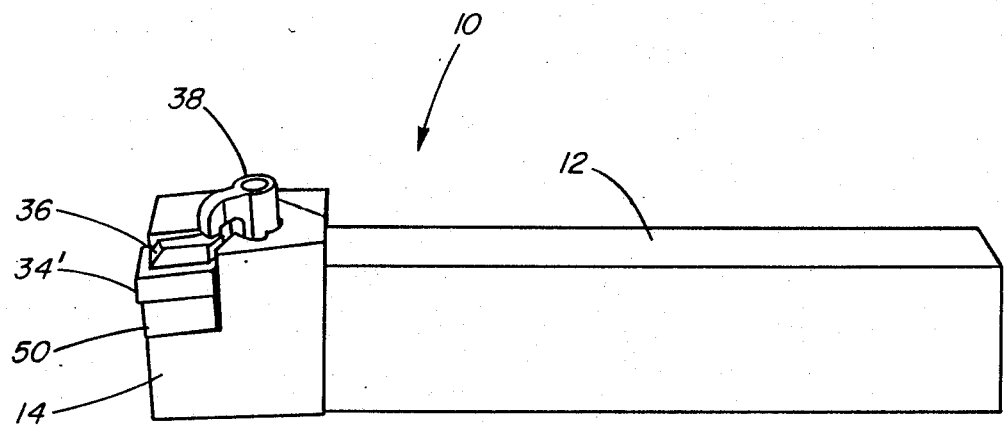
FIG. 1 is a perspective view of the combination tool holder of the present invention.

With further reference to the drawings, particular FIG. 1, the combination tool holder of the present invention is shown therein and indicated generally by the numeral 10.

Before describing the present invention, it may be beneficial to review the basic structure of conventional combination tool holders. In this regard, reference is made to FIGS. 2 and 3. There a combination tool holder is again referred to generally by the numeral 10 and includes a shank portion 12 and a head portion 14. Formed in the head portion 14 is a seat structure 16 having a major threaded bore 18 that extends downwardly from the seat structure 16. In addition, head portion 14 includes a clamp screw bore 20 and a clamp screw 22 that includes opposed threaded ends.

Each combination tool holder 10 shown in FIGS. 2 and 3 is also provided with a shim 24 that includes a shim opening having a counterbore and a throughbore. Because of the counterbored opening it is appreciated that the shim screw opening includes a major or top circumference 24a.

Now turning particularly to the combination tool holder shown in FIG. 2, the same is provided with a lock pin type screw indicated generally by the numeral 26. Lock pin screw 26 functions to secure the shim 24 about seat 16 and also functions to confine or retain a cutting insert 34 that includes a central opening formed therein. More particularly, lock pin screw 26 includes a lower threaded portion 28, an intermediate concentric camming surface 30, an insert retainer head 32 and a shim retaining flange 31. Lock pin screw 26 is threadable within threaded bore 18 and is tightened down to where the intermediate concentric camming surface 30 engages an eccentric tapered bore thus tilting the insert retainer head 32 to secure the cutting insert 34. The shim retaining flange 31 lies within the counterbored shim opening thereby retaining the shim 24. Consequently, lock pin screw 26 stations shim 24 onto seat area 16.

A cutting insert 34 is secured atop shim 24 with the insert retainer head 32 extending through the central opening of cutting insert 34. An optional chip breaker plate 36 is disposed about the top surface of cutting insert 34. To secure and clamp the optional chip breaker plate 36 to the head portion 14 of the combination tool holder there is provided a clamp 38 that screws down on the clamping screw 22 to engage the chip breaker 36 which in turn exerts a downward force on the cutting insert 34.

Now referring to FIG. 3, the same combination tool holder 10 is shown but with a different thickness shim 24 along with a conventional shim retaining screw 40 in lieu of the lock pin type screw 26 shown in FIG. 2. Comparing FIGS. 2 and 3 in other respects, it is noted that the cutting insert 34 shown in FIG. 3 is thicker than the cutting insert shown in FIG. 2 and does not include a central opening therein. The cutting insert is secured by the downward force exerted by the clamp 38. But except as noted, the basic structure and operation of the tool holders shown in FIGS. 2 and 3 are essentially the same.

As shown in FIGS. 2 and 3, the respective shims both include a counterbored opening formed about the top surface of the shim that communicates with a throughbore through the entire shim. This enables the respective shims to be directly secured to the seat area 16. It follows that the diameter or area of circumference 24a has to be larger than the diameter of the shim screw threaded bore 18. The effect of this is that the upper area of the counterbored opening formed in shim 24 effectively decreases the bearing surface of the shim. This can be a problem where the cutting insert 34 is formed of a brittle material that is relatively low in transverse rupture strength. Such cutting inserts are commonly referred to as being formed from advanced cutting materials and generally include ceramic, cermet, CBN (solid cubic boron nitride) and sailon cutting inserts. The concern is that the shim screw opening may be sufficiently large to decrease the shim bearing surface such that the integrity of the brittle insert is at risk.

To accommodate such hard but brittle inserts the present invention is provided with a shim and shim adapter securing assembly that enables the top area of the shim screw opening to be minimized and consequently increases the shim bearing surface. In addition, the present invention presents a shim and shim adapter securing assembly that is compatible with the tool holder, shims and shim securing devices of the type shown in FIGS. 2 and 3.

Figure 4:
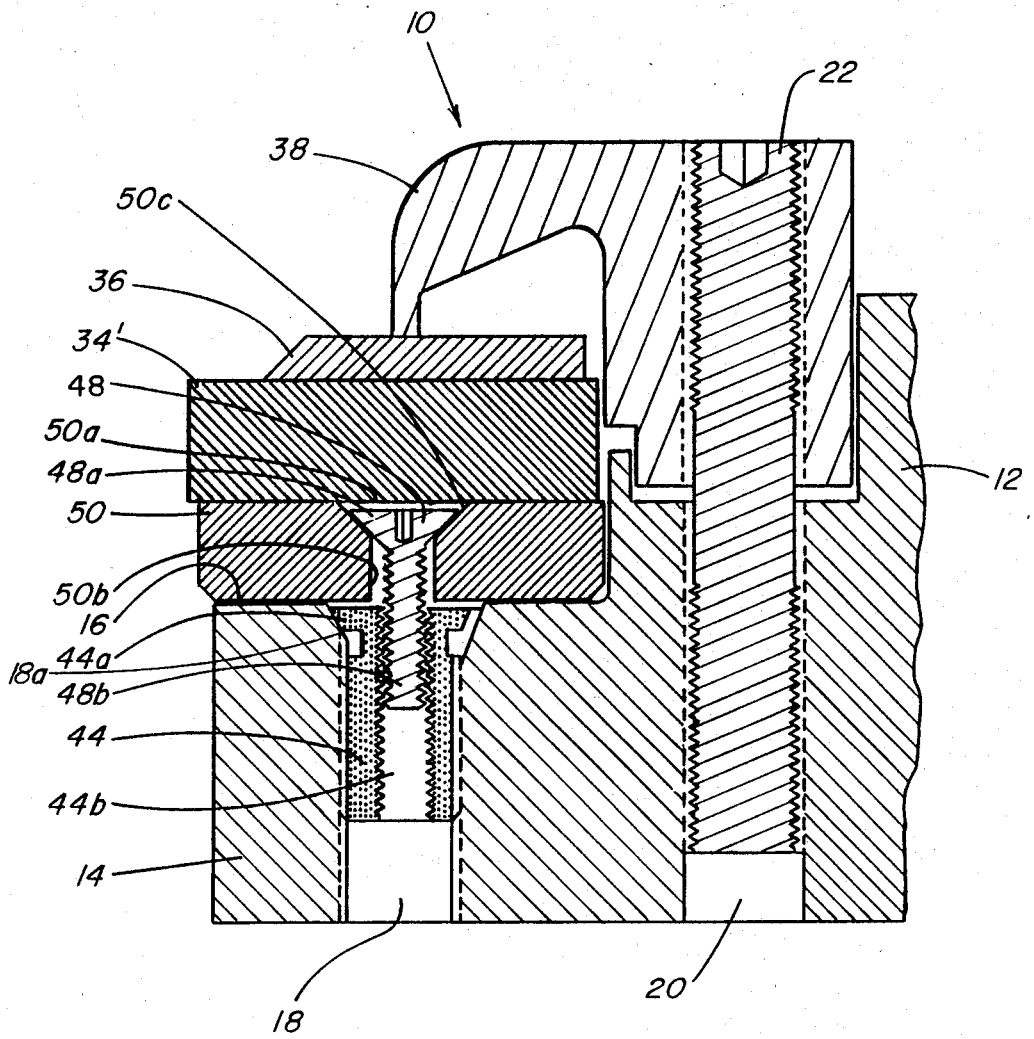
FIG. 4 is a fragmentary sectional view of the combination tool holder shown in FIG. 1 with the shim screw adapter assembly incorporated therein.

Now turning to FIG. 4, the tool holder of the present invention is shown therein and includes a shim 50 that is particularly designed to support a cutting insert 34 that is formed from what is commonly referred to as advanced cutting materials (i.e. ceramic, cermet, CBN, etc.). Shim 50 is designed to be compatible with a conventional combination tool holder of the type shown in FIGS. 2 and 3. Shim 50 is particularly designed such that the area of the top portion of the shim screw opening is minimized. Thus, for a shim with a given top area it is appreciated that by minimizing the area of the shim opening that the effective top bearing surface is increased.

Viewing the total shim screw opening as seen in FIG. 4, it is appreciated that the top portion of the shim opening is tapered and includes a tapered seat 50c. Formed about the top portion of the shim opening is a main or major circumference 50a. Finally, the shim opening includes a throughbore 50b that extends from the tapered seat 50c downwardly through the bottom of shim 50.

To secure shim 50 to the tool holder 12 there is provided a shim securing adapter assembly that is mounted within threaded bore 18 formed in the head portion 14 of the tool holder. This assembly comprises a threaded bushing 44 that in a secured mode is threaded into bore 18. Bushing 44 includes a tapered head 44a that lies below shim seat 16 and contacts the eccentric tapered bore 18a previously mentioned. Formed within bushing 44 is a central threaded bore 44b that extends from the top of the bushing 44 downwardly therethrough. Threaded bore 44b, sometimes referred to as an inner or second bore, is designed to receive a threaded shim screw 48. Shim screw 48 includes a tapered head 48a that is designed to seat within shim seat 50c. Extending from the tapered head 48a is a threaded shaft portion 48b that screws into the inner bore 44b.

Therefore, by providing the bushing 44 with an inner threaded bore for receiving the shim screw 48 then it follows that the shim opening for receiving that shim screw can be made smaller. This effectively increases the top shim bearing surface and makes shim 50 more compatible with brittle cutting inserts (ceramic, cermet, CBN, and sailon). Yet the same tool holder 10 is still a combination tool holder and is adapted to accept shims such as those shown in FIGS. 2 and 3 that are designed to receive a shim securing device that is compatible with the main threaded bore 18.

From the foregoing specification and discussion it is seen that the tool holder 10 of the present invention is capable of accepting conventional carbide tool inserts as well as a wide range of other inserts such as those formed from advanced cutting materials.

The present invention, may of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. In a combination tool holder having the capability of accommodating different types and sizes of cutting inserts, shims, and shim securing devices, and having a seating area, a threaded bore formed in the seating area, the seating area receiving a respective shim, the shim an upper bearing surface having an upper opening and a throughbore extending downwardly from the upper opening through the shim, a cutting insert overlying the respective shim secured within the seating area, and a top clamping device for securing the tool insert over the shim, the improvement comprising an adapter shim securing assembly for extending through the throughbore formed within the shim and securing the shim about the seating area, the adapter shim securing assembly when secured within the tool holder including:
   (a) a bushing threaded in the threaded bore formed below the seating area and having a top portion that lies at or below the seating area;
   (b) a second threaded bore formed in the bushing;
   (c) the threaded bushing having a diameter greater than the diameter of the throughbore extending through the shim while the diameter of the threaded bore formed within the seating area is greater than the diameter of the throughbore extending through the shim;
   (d) a threaded shim screw extending through the throughbore in the shim and secured within the second threaded bore within the bushing so as to engage and secure the shim to the tool holder, and wherein the threaded shim screw is counter-sunken relative to the top of the shim; and
   (e) wherein by providing the diameter of the threaded bushing larger than the diameter of the shim's throughbore enables the size of the upper opening in the shim to be minimized thereby enabling the area of the upper bearing surface of the shim to be maximized.

2. The improved combination tool holder of claim 1 wherein the second threaded bore is formed centrally in the bushing.

3. The combination tool holder of claim 2 wherein the threaded bore within the seating area, bushing, and threaded shim screw are all coaxially aligned.

4. The improved combination tool holder of claim 1 wherein the various shims compatible with the tool holder include different size shim screw openings and wherein the adapter shim securing assembly is particularly adapted to extend through and secure a shim having a smaller opening to the tool holder.

5. A tool holder and shim securing assembly comprising:
   (a) a tool holder having a seating area and a threaded bore that extends generally perpendicular from the seating area and has a tapered bore portion;
   (b) a bushing threaded into the threaded bore and having a top portion that lies at or below the level of the seating area said top portion of said bushing comprising a tapered head for engaging said tapered bore portion;
   (c) a second threaded bore formed in the top portion of the bushing and extending downwardly therefrom;
   (d) a shim including an upper bearing surface having an upper opening and a throughbore extending downwardly from the upper opening through the shim, and wherein the shim is disposed on the seating area of the tool holder such that the throughbore thereof generally aligns with the second threaded bore;
   (e) a shim screw extending downwardly through the throughbore within the shim and threaded into the second threaded bore of the bushing, and wherein the shim screw engages the shim for securing the same about the seating area of the tool holder; and
   (f) wherein the bushing is of a diameter greater than the diameter of the throughbore formed within the shim thereby enabling the size of the opening within the upper bearing surface of the shim to be minimized so that the area of the upper bearing surface of the shim may be maximized.

6. The tool holder of claim 5 wherein the tool holder is compatible with a number of shims having various size shim screw openings formed therein, and wherein the shim securing assembly, is particularly compatible with the shim having the smaller shim screw opening.

* * * * *